Sept. 2, 1958 R. A. THOMPSON 2,849,928
COMBINED HORIZONTAL AND VERTICAL BROACHING MACHINE
Filed Feb. 15, 1955 5 Sheets-Sheet 1
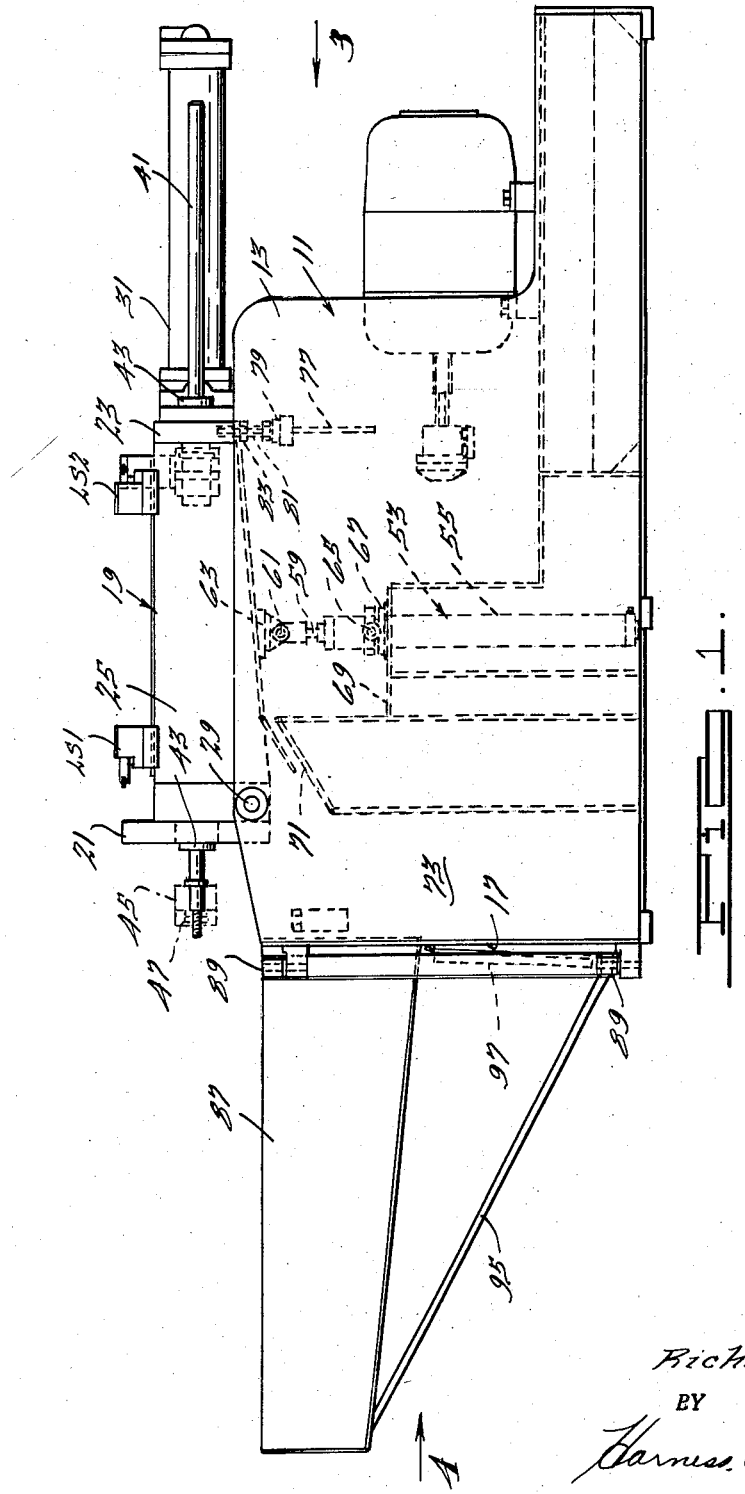
INVENTOR.
Richard A. Thompson
BY
Harness, Dickey & Pierce
ATTORNEYS.

Sept. 2, 1958  R. A. THOMPSON  2,849,928
COMBINED HORIZONTAL AND VERTICAL BROACHING MACHINE
Filed Feb. 15, 1955  5 Sheets-Sheet 2
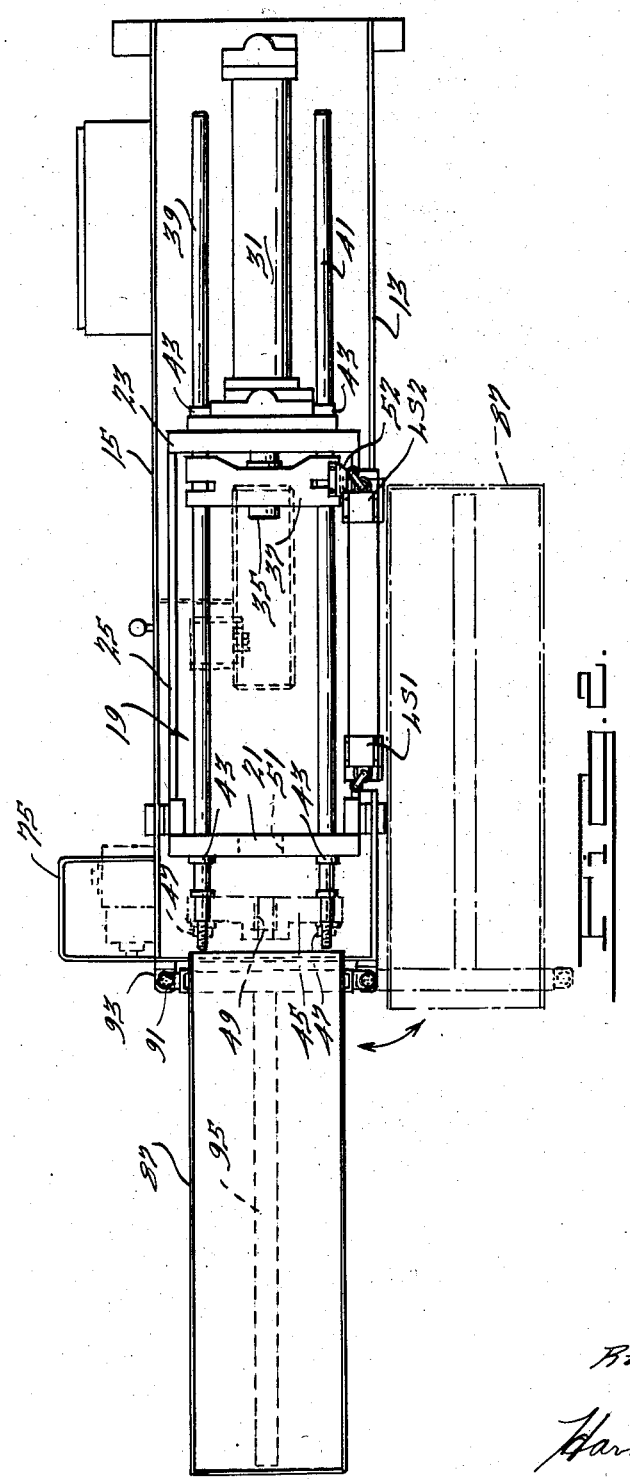
INVENTOR.
Richard A. Thompson
BY
Harness, Dickey & Pierce
ATTORNEYS.

Sept. 2, 1958  R. A. THOMPSON  2,849,928
COMBINED HORIZONTAL AND VERTICAL BROACHING MACHINE
Filed Feb. 15, 1955  5 Sheets-Sheet 3
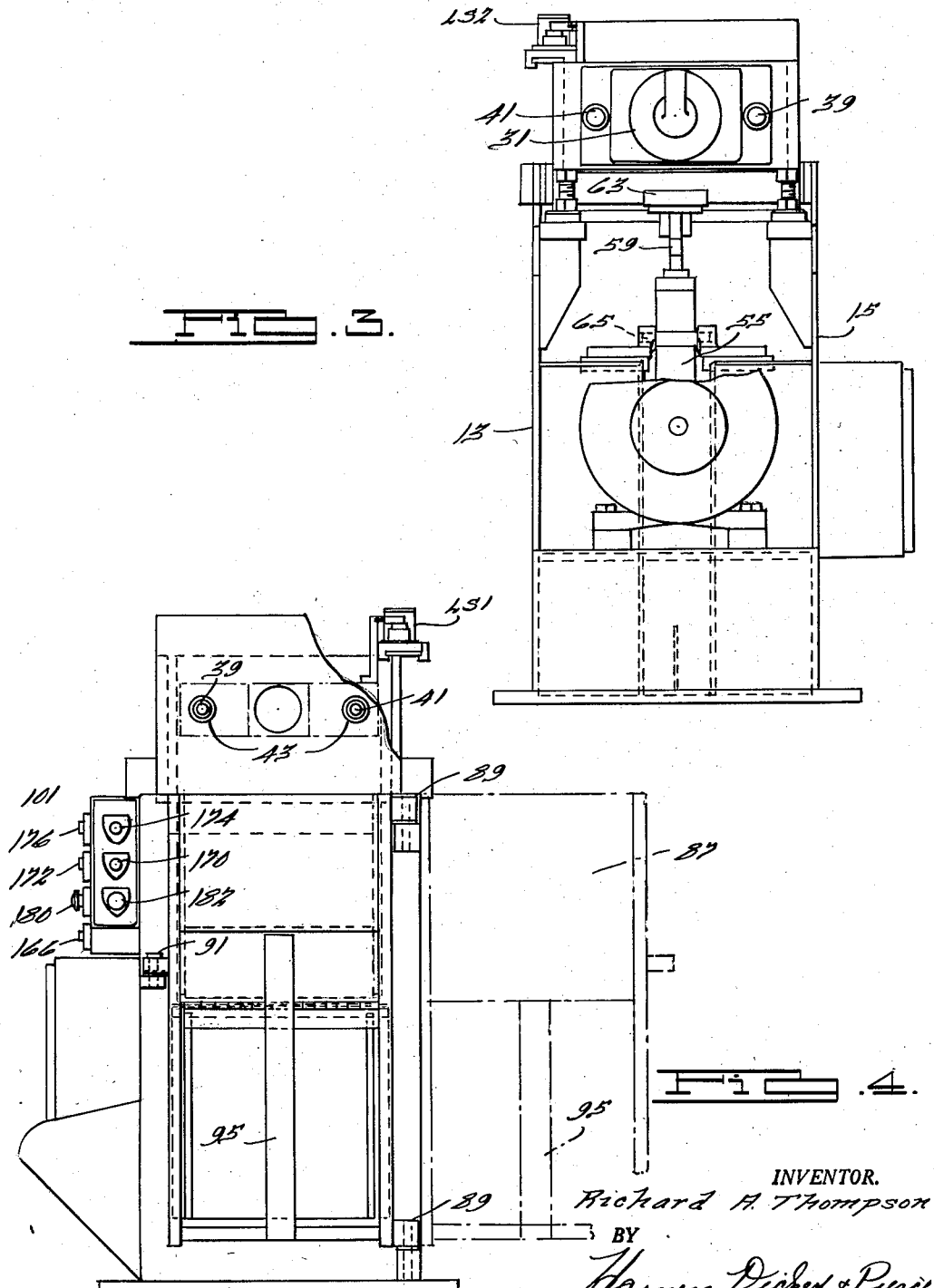
INVENTOR.
Richard A. Thompson
BY
Harness, Dickey & Pierce
ATTORNEYS.

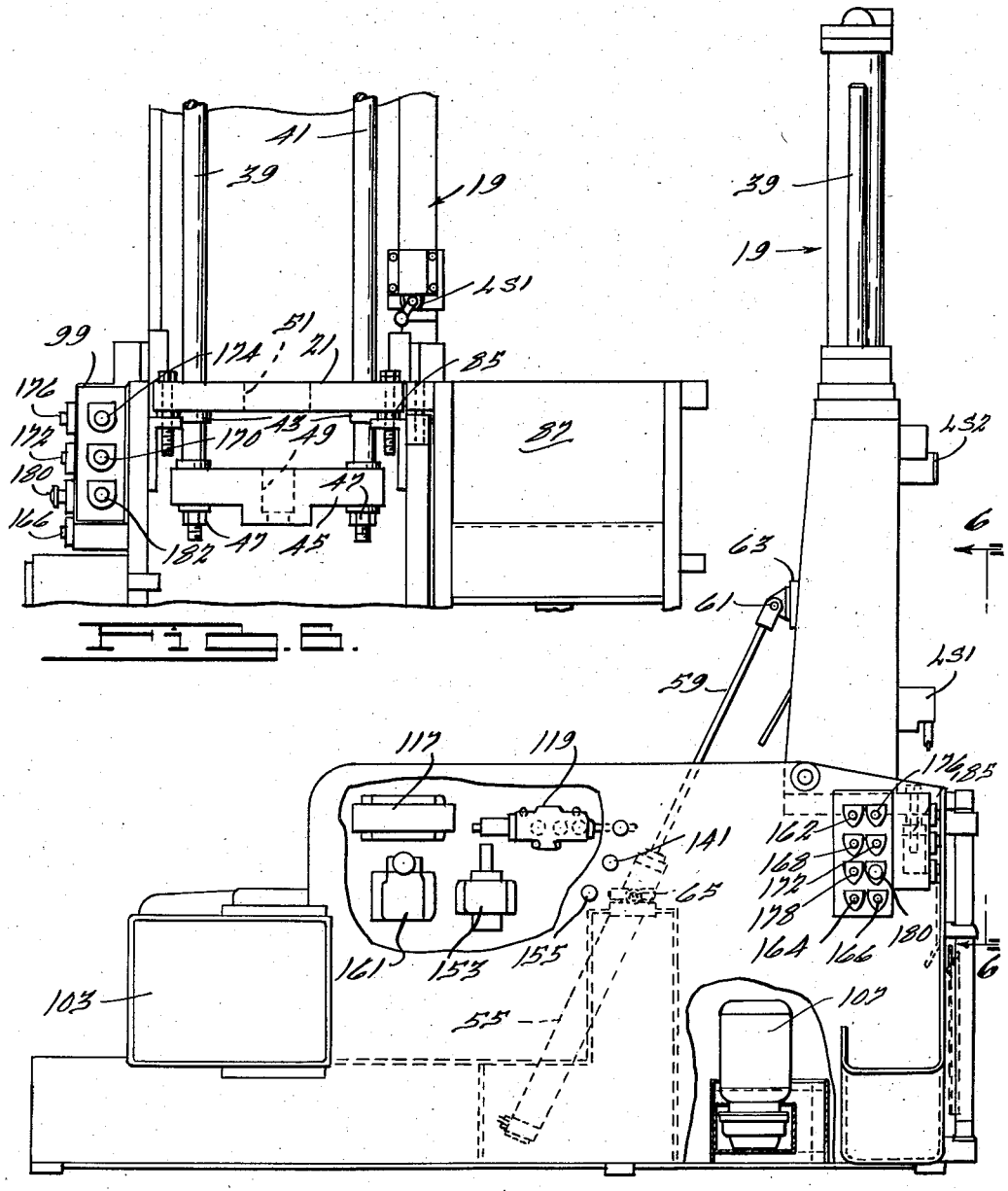

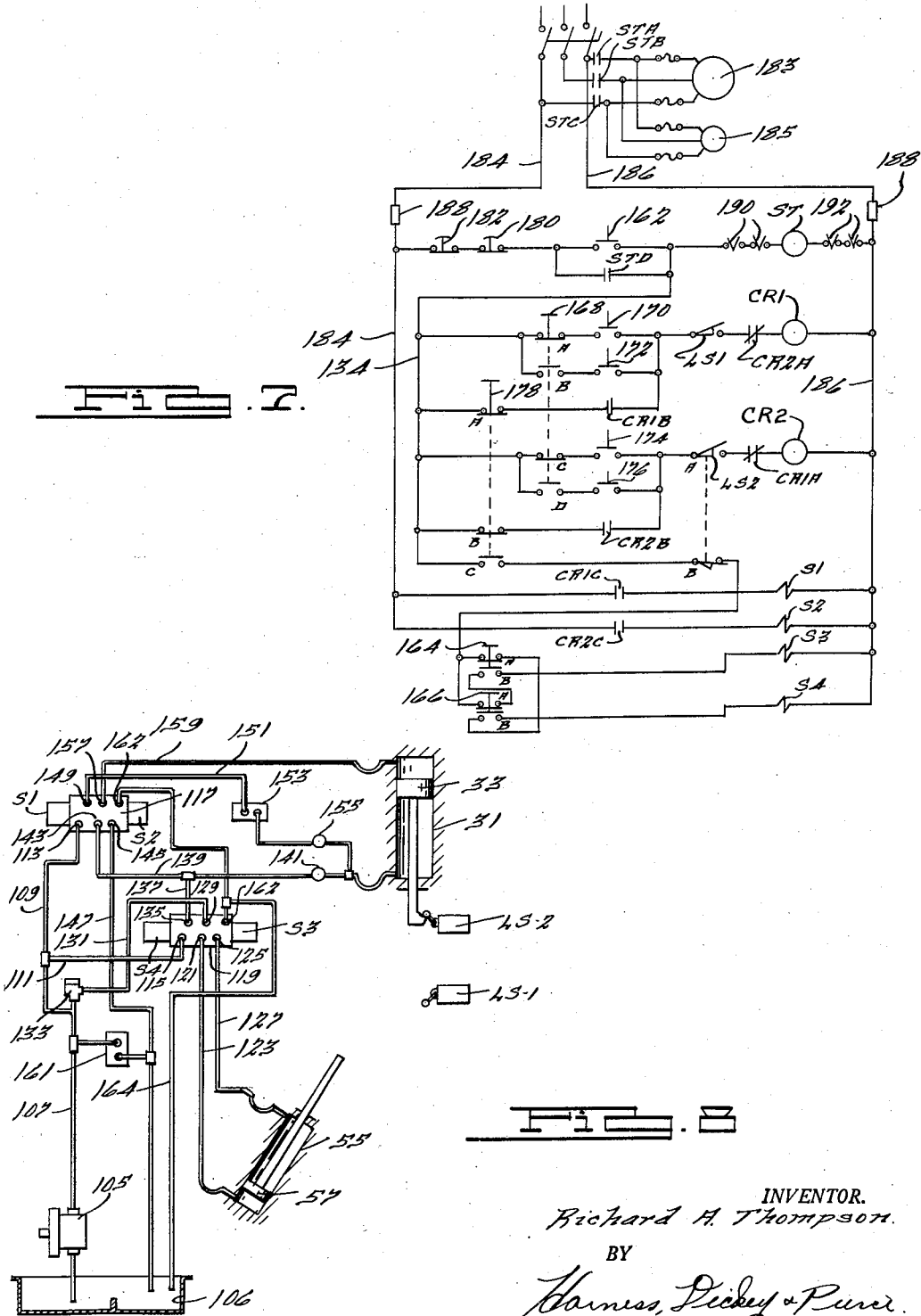

United States Patent Office 2,849,928
Patented Sept. 2, 1958

2,849,928
COMBINED HORIZONTAL AND VERTICAL BROACHING MACHINE

Richard A. Thompson, Detroit, Mich., assignor to Colonial Broach Company, Warren Township, Macomb County, Mich., a corporation of Delaware Application February 15, 1955, Serial No. 488,193

8 Claims. (Cl. 90—33)

This invention relates generally to broaching machines and more particularly to a broaching machine which may be used for horizontal and vertical broaching operations, press operations and the like.

It is well known in the broaching industry that certain broaching operations can more readily be performed on horizontal machines, while other operations are more readily performed in vertical pull-down or push-down machines. It is also well known that broaching machines are relatively expensive and many small plants and shops cannot afford to purchase both horizontal and vertical broaching machines as well as presses when their quantity of work requiring such machines is relatively small.

It is therefore an object of this invention to provide a combination machine which may be used to perform vertical broaching operations, horizontal broaching operations, press operations and the like.

It is a further object of this invention to provide a machine of the aforementioned type, which may be converted to either a vertical or horizontal machine, quickly and easily.

It is a still further object of this invention to provide a machine of the aforementioned type which is capable of performing precision operations required of excellent broaching equipment.

It is a still further object of this invention to provide a machine of the aforementioned type, which may be used as a press as well as used for broaching operations.

It is a still further object of this invention to provide a machine of the aforementioned type having relatively simple and inexpensive electrical and hydraulic control circuits and which is especially durable and relatively inexpensive to manufacture.

These and other objects of this invention will become apparent from the following detailed description, taken in conjunction with the accompanying drawings, in which:

Figure 1 is a side elevational view of the machine of this invention disposed in a horizontal broaching position;

Fig. 2 is a top plan view of the structure illustrated in Fig. 1;

Fig. 3 is a rear elevational view of the structure illustrated in Figure 1, taken in the direction of the arrow 3 thereon;

Fig. 4 is a front elevational view of the structure illustrated in Fig. 1, taken in the direction of the arrow B thereof;

Fig. 1 is a side elevational view of a machine of this invention in a vertical broaching position and with parts broken away for purposes of clarity;

Fig. 6 is an enlarged elevational view of structure illustrated in Fig. 5, taken along the line 6—6 thereof;

Fig. 7 is a diagrammatic view of the electrical circuit of the machine of this invention; and Fig. 8 is a diagrammatic view of the hydraulic circuit of this invention.

Referring now to the drawings, it will be seen that the machine includes a stationary base 11 having opposed side walls 13 and 15 and a front wall 17. An elongated broaching trough or housing structure 19 is pivotally supported on the base 11 for movement between a generally vertical and a generally horizontal position. The elongated housing 19 includes a front or lower end wall 21 which forms a platen for a workpiece to be broached, as will be hereinafter described, and a rear end wall 23. The end walls 21 and 23 are connected by means of side walls 25 to provide a rigid structure. The housing 19 is pivotally connected to the base side walls 13 and 15 by means of suitable trunnions 29 disposed just rearwardly of the platen 21. The housing may therefore swing about the horizontal axis of the trunnions 29 between a horizontal and a vertical position. A cylinder 31 of a hydraulic piston and cylinder unit, is rigidly connected with the end wall 23 of the housing in any suitable manner. A piston 33 is reciprocably supported in the cylinder in a conventional manner and a piston rod 35, connected with the piston, extends through the front end of the cylinder 31.

A cross head member 37 is rigidly connected with the projecting end of the piston rod 35 forwardly of the housing end wall 23. It will, however, be noted that the piston rod 35 projects forwardly of the cross head 37 and is adapted to have a broach chuck or carrying device connected therewith. A pair of laterally spaced guide bars or rods 39 and 41 are slidably supported in the housing end walls 21 and 23 for fore and aft movement by any suitable means such as bushings 43. The cross head 37 is rigidly connected with the guide bars 39 and 41 and a cross head 45 is connected with the guide bars forwardly of the housing end wall 21. The cross head 45 is detachably connected with the guide bars by any suitable means such as nuts 47 threaded on the forward ends of the guide bars. The cross head 45 should be easily removable from the guide bars for certain machine operations, as will hereinafter appear. Furthermore, the cross head 45 is suitably recessed at 49 for the reception of a broach chuck or carrying device, as will appear. It should also be appreciated that the housing end wall or platen 21 is suitably apertured at 51 so as to permit the passage of a broach therethrough so that when a workpiece is supported thereon by a fixture the broach may pass through the aperture in a conventional manner. It will thus be appreciated that when the piston rod 35 is moved fore and aft when the piston and cylinder unit is actuated, the cross head 37 will move the guide bars 39 and 41 fore and aft and thus carry the cross head 45 therewith. It should also be noted that the cross head 37 carries a switch actuator 52 for actuating switches LS1 and LS2 for a purpose which will appear hereinafter.

In order to move the housing 19 between a generally horizontal and a generally vertical position, a suitable power mechanism 53 is provided. The power mechanism illustrated is of the hydraulically actuated piston and cylinder type which includes a cylinder 55 having a bore fitting piston 57 (Fig. 8) disposed therein. A piston rod 59 extends through the upper end of cylinder 55 and is connected with the piston in a usual manner. The upper end of the piston rod 59 is pivotally connected, at 61, for movement about a generally horizontal axis, to a bracket 63 which in turn is rigidly connected to the underside of the housing 19. The cylinder 55 intermediate the ends thereof, is pivotally connected, at 65, for movement about a generally horizontal axis, to a bracket 67 supported on a wall 69 within the stationary base 11.

It should at this time be noted that the stationary base is provided with a downwardly and forwardly inclined wall 71 disposed forwardly of the cylinder 55 and below the housing trunnion 29 so as to direct chips and other foreign matter into a chamber 73 in the forward end of the stationary base. It will also be appreciated that a chip chute 75 communicates through the side wall 15 of the stationary base with the lower end of the chamber 73, to permit the easy removal of the chips from the chamber.

When the piston and cylinder unit is actuated, as will be hereinafter described, to move the housing 19 from the horizontal position illustrated in Fig. 1 to the vertical position illustrated in Fig. 5, the cylinder 55 will swing about its pivot 65 and the piston rod 59 will swing about its pivot 61 in the manner illustrated. In order to positively retain the housing means in a predetermined horizontal position, complemental abutment means are provided on the housing and on a wall 77 of the stationary base 11. One of said abutment means is preferably adjustable to permit the horizontal position of the housing to be adjusted within limits. In the particular embodiment illustrated, a solid abutment 79 is supported on the wall 77, while an adjustable abutment 81 is connected with the underside of the housing 19. The adjustable abutment 81 may take the form of a cap screw threaded into the underside of the housing 19 and locked in any desired position by a suitable lock nut 83, or the like. In order to releasably lock the housing means in a predetermined vertical position, a suitable adjustable lock mechanism 85 is provided on the housing and on the stationary base, as illustrated in Fig. 5, to releasably lock the housing means in a predetermined position relative to the base. A chip trough 87 is supported on the stationary base 13 at the front thereof and when the machine is operating with the housing 19 in the horizontal position the chip trough 87 is positioned as illustrated in Figs. 1 and 2. The chip trough is, however, hingedly connected at 89 to the front end of the stationary base 11 so as to be swingable away from the front of the machine and to one side thereof, such as illustrated in dot and dash lines in Fig. 2, when the housing is to be disposed in a vertical operating position. In this connection, a lock pin 91 is carried by the trough to engage a bracket 93 connected to the front wall 17 of the stationary base, for releasably locking the chip trough 87 in its forwardly extending position. The pin 91 may be moved upwardly out of engagement with the bracket 93 to permit the trough to be swung to its position along the side of the base when desired. It should be noted that the chip trough is reinforced by a suitable diagonal brace 95. The front wall 17 of the stationary base is open, in alignment with the chip trough 87, so that any chips falling into the trough will move down the inclined bottom of the trough into the chamber 73. However, when the chip trough 87 is swung to its position alongside of the machine for vertical operations, a cover 97, which is hinged to the front wall 17 below the opening therein, is swung upwardly to close the opening and prevent chips from falling therefrom onto the floor of the building.

As has been previously explained, this machine may be used for both horizontal and vertical operations. The cross head 45 is generally removed for all except vertical pull-down broaching operations. That is, for vertical push-down operations and horizontal operations a broach or other tool is generally connected directly to the piston rod 35 and there is no need for the cross head 45. However, for pull-down operations the broach is attached to the cross head 45 and pulled downwardly through the workpiece supported on the platen 21. For this reason the cross head must be quickly and easily removable. Also, in order to enable the machine to be easily used for both vertical and horizontal operations a control box or panel 99 is supported on the stationary base on one side wall thereof adjacent the front of the machine. The panel has a plurality of operating buttons 101 thereon projecting from both the side and front thereof so that the machine operator can stand at the front of the machine for vertical operations and at the side of the machine for horizontal operations. The buttons 101 on the side and on the front are interconnected so as to operate the same elements of the machine, as will appear hereinafter in connection with the description of the hydraulic and electrical circuits. It will also be noted that an electric panel 103 is supported on the machine adjacent the rear end thereof, for housing the necessary electrical controls. The remainder of the elements illustrated in the drawings will be described in connection with the machine hydraulic and electrical systems.

In this connection it will be noted that a main hydraulic liquid pump 105 is provided for operating the piston and cylinder units. In addition, and not illustrated in Fig. 8 but seen in Fig. 5, a coolant pump 107 is provided for supplying coolant to the broach and workpiece in a conventional manner, not specifically illustrated.

As can be clearly seen in Fig. 8, pump 105 delivers liquid under pressure through conduit 107 and through conduits 109 and 111 to ports 113 and 115 in solenoid operated pilot controlled valves 117 and 119 respectively, so as to provide liquid under pressure for shifting the main spool in each valve when the pilot spool is actuated by its solenoids, all in a conventional manner. It will be noted that solenoids S1 and S2 are provided in valve 117, and solenoids S3 and S4 in valve 119. Valve 119 is provided with a port 121 which communicates with the lower end of cylinder 55 through a conduit 123, while valve port 125 communicates with the upper end of the cylinder 55 through a conduit 127. The valve likewise is provided with a main pressure port 129 which is connected with the pump through conduit 131, a check valve 133 and conduit 107. The check valve 133 is provided to insure pressure to the ports 115 and 113 even though the valves 117 and 119 may be in a neutral position wherein liquid entering the valve merely returns to tank or reservoir 106 without doing any work. That is, valve 133 is a check valve which will open only upon the application of, for example, fifty pounds of pressure from the pump. Valve 119 is likewise provided with a tank or outlet port 135 which communicates with a conduit 137, which in turn communicates with a conduit 139. The conduit 139 in turn communicates with the lower end of the cylinder 31 through a manually operated globe valve 141 and with a pressure port 143 in valve 113. Valve 113 likewise is provided with a tank or outlet port 145 which communicates with the system reservoir or tank 106 through a conduit 147. Valve 117, in addition, is provided with a port 149 which communicates with the lower end of the cylinder 31 through a conduit 151 which has a foot valve 153 therein and a manually controlled globe valve 155. The conduit 151 connects with the conduit 139 between globe valve 141 and the cylinder 31. Valve 117 likewise has a port 157 which communicates with the upper end of cylinder 31 through a conduit 159. It will also be noted that a relief valve 161 is provided between conduits 107 and 147 to act as a safety valve for the entire system. The valves 117 and 119 are of the type which are in a neutral position when their solenoids are both de-energized, so that liquid under pressure flowing therethrough merely returns to tank 106 and will not actuate any of the piston and cylinder units. Likewise both valves have conventional drain ports 162 which are connected to tank 106 through conduit 164.

Therefore, when the housing means 19 is in a vertical position and it is desired to lower the piston 33 so as to move the broach or other tool carried by the piston rod downwardly, solenoid S1 is energized, which shifts the pilot spool of valve 117 so that port 157 is connected with port 143, while port 145 is connected with port 149. Therefore liquid flowing from pump 105 will flow through conduits 107 and 131 into port 129 of valve 119, out through port 135 and conduit 137, into conduit 139. Globe valve 141 is closed so that liquid cannot flow to the lower end of cylinder 31 through conduit 139. The liquid will therefore flow under pressure into port 143 of valve 117, to port 157 and through conduit 159, into the upper end of cylinder 31, to force the piston 33 downwardly. Liquid in the lower end of cylinder 31 will flow outwardly therefrom through conduit 151, to port 149 of valve 117 and through port 145 and conduit 147 to tank.

When it is desired to raise piston 33, solenoid S2 is energized, which causes the valve 117 to shift so that port 149 is connected to port 143 and so that port 145 is connected with port 157. Therefore liquid will flow from pump 105 through conduit 107, past check valve 133, into conduit 131 through valve ports 129 and 135, into conduit 137 and thence into conduit 139. As globe valve 141 is still closed, the liquid under pressure will flow into port 143 of valve 117 and from there through port 149 of the valve through conduit 151, through the foot valve 153 and open globe valve 155 into the lower end of cylinder 31 so as to raise the piston 33. Liquid in the upper end of cylinder 31 will flow therefrom through conduit 159 into port 157 of valve 117 and thence through port 145 into the tank conduit 147 and back into tank 106.

When it is desired to move the housing means 19 from the vertical position previously described to the horizontal position, solenoid S4 is energized, connecting port 129 of valve 119 with port 125 thereof so that liquid flowing to the valve from the pump 105, through conduits 107 and 131, will flow under pressure through conduit 127 into the upper end of cylinder 55 to cause the piston 57 thereof to move downwardly. Liquid in the lower end of cylinder 55 will flow into conduit 123 through port 121 of valve 119 and port 135 through conduit 137, conduit 139, into the valve 117 through port 143. As the valve 117 is in its neutral position, fluid will flow from port 143 through port 145 and conduit 147, back to tank. After the housing means is in its horizontal position, solenoid S4 is de-energized, thus returning valve 119 to its neutral position. Globe valve 155 is then closed and globe valve 141 opened.

When it is then desired to move the piston 33 toward the platen 21, solenoid S1 is actuated so as to connect valve port 157 with valve port 143 and valve port 149 with valve port 145. Therefore liquid flowing under pressure from pump 105 will flow through conduit 107 past check valve 133, through conduit 131 and into port 129 of valve 119, thence through port 135, conduit 137, conduit 139, port 143 of valve 117, port 157 and conduit 159 into the back end of cylinder 31, so as to move the piston 33 outwardly or toward the platen. Liquid in the forward end of cylinder 31 will flow therefrom into conduit 139, through the open globe valve 141 and thence into the same conduit in which fluid under pressure is flowing to the opposite end of the cylinder so as to give a rapid return movement of the piston.

When it is desired to move the piston 33 rearwardly, or away from the platen, solenoid S2 is energized, which will connect port 157 of valve 117 with port 145 and port 149 with port 143. Therefore, liquid flowing from pump 105 will flow through conduit 107 past check valve 133 into conduit 131 and port 129 of valve 119 and thence through port 135 into conduit 137 and conduit 139. As globe valve 155 is closed, liquid will not flow through ports 143 and 149 of valve 117 but instead will flow through globe valve 141 in conduit 139 into the forward end of cylinder 31 to push the piston 33 rearwardly. Liquid in the rear end of cylinder 31 will flow through conduit 159 into port 157 of valve 117 and thence through port 145 of valve into the tank conduit 147 and thence into tank.

When thereafter it is desired to again move the housing from a horizontal position to a vertical position, solenoid S3 of valve 119 is energized, which causes port 129 of valve 119 to be connected with port 121, while port 125 is connected with port 135, valve 117 being in a neutral position with neither solenoid energized. Liquid will then flow from pump 105 through conduit 107, past check valve 133, through conduit 131, into port 129. Liquid will then flow through port 121 and conduit 123 into the lower end of the cylinder 55 to cause the piston 57 to move upwardly and thus move the housing 19 to its vertical position. Liquid in the upper end of cylinder 55 will flow out therefrom through conduit 127 into port 125 of valve 119, thence through port 135 into conduit 137 and conduit 139, thence through port 143 of valve 117 and port 145 thereof, thence through conduit 147 to tank 106.

The hydraulic circuit for operating the machine having thus been described, the electrical circuit which controls the position of the valves of the hydraulic circuit will now be described in detail, in conjunction with Fig. 7 of the drawing.

The aforesaid control panel 103 includes a plurality of switches for controlling the hydraulic circuits shown in Fig. 8 of the drawings. These switches include a motor starting switch 162, which is mechanically biased so as to be normally open, a switch 164 which, when actuated, controls cylinder 55 to elevate the housing 19 to its vertical operating position, and a switch 166 which, when actuated, controls cylinder 55 to lower the housing to its horizontal operating position. Each of the switches 164 and 166 includes a normally closed contact A and a normally open contact B.

A switch 168, preferably in the form of a key, is also mounted upon the control panel. The position of the two-position switch 168 is set in accordance with whether the mechanism is to be operated vertically or horizontally. For vertical operation, switch 168 is set to its shown position in which its contacts A and C are closed and its contacts B and D are open, and for horizontal operation, switch 168 is operated to its other position in which its contacts B and D are closed and its contacts A and C are open. Switches 170 to 176 serve to control the movement of the piston 33 in ram cylinder 31, as will be described hereinafter. Two-position switch 178, provided with contacts A, B and C, is placed in the shown position for continuous running of the machine and is switched or depressed to the other position for jogging operations.

Additionally, a normally closed stop switch 180 is also mounted upon the control panel, and a plurality of emergency stop switches 182 are preferably distributed around the machine so that the operation of the machine may be immediately terminated in the event an emergency arises.

In the circuit of Fig. 8 it is assumed that a three-phase alternating current supply powers the motor 183, which operates the main hydraulic pump 105, and the motor 185 which operates the coolant pump 107. The control circuits, however, are energized by a single-phase power supply, i. e., by the power appearing between conductors 184 and 186, which are individually fused by fuses 188, as shown.

Assuming that neither of the motors 183 and 185 is overheated, momentary depression of the motor start switch 162 will result in the completion of a circuit from conductor 184, through the several normally closed emergency stop switches 182 and normally closed stop switch 180, through the motor start switch 162, through the main motor overload contacts 190, through the winding of relay ST, and through the coolant motor overload contacts 192 to line 186, resulting in the operation of relay ST. Relay ST, in operating, closes its contacts STA, STB and STC to energize the main motor 183 and the coolant motor 185, and closes its contact STD to complete a locking circuit for relay ST in shunt of the motor start switch 162. With the circuits in their shown condition, nothing more will transpire until an operator actuates one or more switches.

Thus, the voltage appearing on conductor 184 is applied through the stop switches 182 and 180 and through contact STD of relay ST to conductor 134. As a result, the operator can move the ram piston 33 down, during vertical operation, by operating switch 170, or up by operating switch 174, or, during horizontal operation, he can move the ram piston 33 toward the platen 21 by operating switch 172 or away from the platen by operating switch 176. Thus, while the mechanism is being operated vertically, during which switch 168 is in the shown position with its contacts A and C, only, closed, depression of switch 170 will complete a circuit from conductor 134, through contact A of switch 168, through switch 170, closed limit switch LS–1, normally closed contacts CR2A of unenergized relay CR2, and through the winding of relay CR1 to conductor 186, producing the operation of relay CR1. Alternatively, the operator may depress switch 174 to complete a circuit from conductor 134, closed contact C of switch 168, switch 174, contact A of limit switch LS–2, which obviously must be closed for any action to occur, normally closed contact CR1A of unoperated relay CR1, and through the winding of relay CR2 to conductor 186.

The same selective, alternative operation of relay CR1 or CR2 may be accomplished during horizontal operation of the mechanism, during which switch 168 is in its depressed position wherein its contacts B and D, only, are closed. Relay CR1 may then be operated by momentarily depressing switch 172 and, alternatively, relay CR2 may be operated by momentarily depressing switch 176.

It will be recognized that switches 168, 172 and 176 need not be provided in a commercial embodiment of the invention if each of the switches 170 and 174 is provided with distinctive labels applicable to both vertical and horizontal operation of the mechanism.

It will be apparent that since the energizing circuit for relay CR1 includes a back contact of relay CR2, and since the energizing circuit for relay CR2 includes a back contact of relay CR1, concurrent operation of the two relays is not possible. Thus, if relay CR1 operates, it opens its contact CR1A to disable relay CR2, and conversely.

Relay CR1, in operating, also closes its contacts CR1B. If switch 178 is in the "job" position wherein its contact A is open, the closure of switch CR1B will produce no useful result. However, if switch 178 is in its shown position a locking circuit for relay CR1 will be completed from conductor 194, contact A of switch 178, closed contact CR1B, limit switch LS1, closed contact CR2A of relay CR2, and through the winding of relay CR1 to conductor 126, whereby movement of the ram will continue despite the release of switches 170 or 172.

Relay CR1, in operating, also closes its contact CR1C to complete a circuit from conductor 184, through the winding of solenoid S1 to open valve 117 to move the ram piston 33 downwardly, during vertical operation, or toward the platen 21 during horizontal operation. This movement of the ram piston will continue until that ram reaches its final position wherein it trips limit switch LS1 to interrupt both the operating and locking circuits for relay CR1. However, if switch 178 is placed in its "jog" position wherein its contact A is open, movement of the ram piston will continue only so long as switch 170 or switch 172 is manually closed, but motion of ram piston 33, even in that case, will terminate when the ram is moved into a position to trip limit switch LS1.

The operation of relay CR2 produces a similar but opposite result. Thus, relay CR2, in operating, disables the energizing circuit of relay CR1, completes a locking circuit for itself if switch 178 is in the shown "run" position, and completes a circuit through its contact CR2C to energize solenoid S2 to actuate valve 117 to move the ram piston 33 upwardly, during vertical operation, or away from the platen 21 during horizontal operation. If contact B of switch 178 is closed, this motion of the ram piston will continue despite the release of switch 174 or 176, whereas if switch 178 is depressed whereby its contact B is open, this motion will continue only as long as switch 174 or switch 176 is held in its depressed position.

In order to elevate the housing means 19 from the horizontal position of operation to the vertical, solenoid S3 must be operated to actuate valve 119 as described to move the piston 57 upwardly, and in order to lower the housing 19 from its vertical to its horizontal position of operation, solenoid S4 must be operated to actuate valve 119 to move the piston 57 downwardly.

Solenoid S3 is controlled by switch 164 and solenoid S4 is controlled by switch 166. As conditions precedent to the operation of either solenoid S3 or solenoid S4, voltage must appear on conductor 134 as a result of a prior operation of the motor start switch 162, and switch 178 must be in its "jog" position wherein its contact C is closed, and the ram piston 33 must be fully retracted, i. e., during vertical operation, must be fully up, or in horizontal operation, must be fully to the right (Fig. 2), wherein limit switch LS2 is triggered so that its contact B is closed. These conditions being met, solenoid S3 may be operated by depressing switch 164 to complete an operating circuit for solenoid S3 through the normally closed contact A of switch 166, through the now closed contact B of switch 164, and through the winding of solenoid S3 to conductor 186. Alternatively, solenoid S4 may be operated by depressing switch 166 whereupon an energizing circuit will be completed through the normally closed contact A of switch 164, through the now closed contact B of switch 166, and through the winding of solenoid S4 to conductor 186. Since the energizing circuit for solenoid S3 includes a normally closed contact of switch 166 and since the energizing circuit for solenoid S4 includes a normally closed contact of switch 164, concurrent operation of switches 164 and 166 will produce no useful result in that neither solenoid S3 or S4 will be operated.

If desired, a normally closed limit switch may be placed in series with the winding of solenoid S3 and arranged to be triggered open when the mechanism reaches its vertical position, and a normally closed limit switch may be placed in series with solenoid S4 and arranged to be triggered open when the mechanism reaches its horizontal position.

What is claimed is:

1. A combination horizontal and vertical broaching machine, including a base, elongated housing means supported on said base and including spaced apart end walls, means pivotally connecting said housing means with said base adjacent of one of said end walls to permit said housing means to be swung between a generally vertical and a generally horizontal position, a cylinder rigid with the other of said housing means end walls, a piston reciprocable in said cylinder, a piston rod projecting from said cylinder toward said one end wall and movable along a path disposed at substantially ninety degrees (90°) relative thereto, a head member connected with said piston rod, a pair of bar members disposed on opposite sides of said piston rod and rigidly connected with said head, said bar members extending through and being slidably disposed in said opposite housing means end walls, means for actuating said piston in said cylinder so that actuation thereof will cause said piston rod and said bar members to move relative to said end walls, said one of said end walls being adapted to support a workpiece to be broached, said piston being connectible to a broaching tool so as to move the broaching tool relative to said one end wall upon movement of said piston rod, and a power mechanism connected with said base and with said housing means actuatable to move said housing means between a generally horizontal and a generally vertical position.

2. A combination horizontal and vertical broaching machine, including a base, elongated housing means supported on said base and including spaced apart end walls, means pivotally connecting said housing means with said base adjacent one of said end walls to permit said housing means to be swung between a generally vertical and a generally horizontal position, a cylinder rigid with the other of said housing means end walls, a piston reciprocable in said cylinder, a piston rod projecting from said cylinder toward said one end wall and movable along a path disposed at substantially ninety degrees (90°) relative thereto, a head member connected with said piston rod, a pair of bar members disposed on opposite sides of said piston rod and rigidly connected with said head, said bar members extending through and being slidably disposed in said opposite housing means end walls, means for actuating said piston in said cylinder so that actuation thereof will cause said piston rod and said bar members to move relative to said end walls, said one of said end walls being adapted to support a workpiece to be broached, said piston being connectible to a broaching tool so as to move the broaching tool relative to said one end wall upon movement of said piston rod, a generally vertically extending cylinder supported on said base below said housing means, means pivotally connecting said cylinder with said base for movement about a generally horizontal axis, a piston disposed in said cylinder, a piston rod connected with said piston and extending upwardly through said cylinder, and means pivotally connecting the upper end of said piston rod to said housing means for movement about a generally horizontal axis parallel to the pivotal axis of said cylinder.

3. A combination horizontal and vertical broaching machine, including a base, elongated housing means supported on said base and including spaced apart end walls, means pivotally connecting said housing means with said base adjacent one of said end walls to permit said housing means to be swung between a generally vertical and a generally horizontal position, a cylinder rigid with the other of said housing means end walls, a piston reciprocable in said cylinder, a piston rod projecting from said cylinder toward said one end wall and movable along a path disposed at substantially ninety degrees (90°) relative thereto, a head member connected with said piston rod, a pair of bar members disposed on opposite sides of said piston rod and rigidly connected with said head, said bar members extending through and being slidably disposed in said opposite housing means end walls, means for actuating said piston in said cylinder so that actuation thereof will cause said piston rod and said bar members to move relative to said end walls, said one of said end walls being adapted to support a workpiece to be broached, said piston being connectible to a broaching tool so as to move the broaching tool relative to said one end wall upon movement of said piston rod, a power mechanism connected with said base and with said housing means actuatable to move said housing means between a generally horizontal and a generally vertical position, and complemental abutment means on said housing means and on said base spaced from said housing pivotal connection means and engageable to releaseably retain said housing means in a predetermined position relative to said base, one of said abutment means being adjustable to permit adjustment of said predetermined position.

4. A combination horizontal and vertical broaching machine, including a base, elongated housing means supported on said base and including spaced apart end walls, means pivotally connecting said housing means with said base adjacent one of said end walls to permit said housing means to be swung between a generally vertical and a generally horizontal position, a cylinder rigid with the other of said housing means end walls, a piston reciprocable in said cylinder, a piston rod projecting from said cylinder toward said one end wall and movable along a path disposed at substantially ninety degrees (90°) relative thereto, a head member connected with said piston rod, a pair of bar members disposed on opposite sides of said piston rod and rigidly connected with said head, said bar members extending through and being slidably disposed in said opposite housing means end walls, means for actuating said piston in said cylinder so that actuation thereof will cause said piston rod and said bar members to move relative to said end walls, said one of said end walls being adapted to support a workpiece to be broached, said piston being connectible to a broaching tool so as to move the broaching tool relative to said one end wall upon movement of said piston rod, a power mechanism connected with said base and with said housing means actuatable to move said housing means between a generally horizontal and a generally vertical position, and a head member rigidly connected with said bar members on the opposite side of said one wall from said piston rod and adapted to support a broach pulling chuck.

5. A combination horizontal and vertical broaching machine, including a base having front, back and side walls, elongated housing means supported on said base for movement between a generally vertical and a generally horizontal position, means pivotally connecting said housing means adjacent the front end thereof to said base for movement about a generally horizontal axis, said housing means including a workpiece platen disposed adjacent the front end thereof and adjacent said pivotal connection, a broach supporting mechanism supported on said housing means for movement toward and away from said workpiece platen, a power mechanism supported on said housing means and connected with said broach supporting mechanism for moving the same toward and away from said housing means platen, means for actuating said power mechanism, and a chip trough supported on said base and extending forwardly from the front wall thereof, said chip trough being pivotally-supported on said base so as to be swingable between a position extending forwardly of said base and a position at the side of said base, whereby when said housing means is disposed in a horizontal position said chip trough is disposed in its position extending forwardly from said base and whereby when said housing means is disposed in a vertical position said chip trough may be swung to the side of said base.

6. A combination horizontal and vertical broaching machine, including a base having front, back and side walls, elongated housing means supported on said base for movement between a generally vertical and a generally horizontal position, means pivotally connecting said housing means adjacent the front end thereof to said base for movement about a generally horizontal axis, said housing means including a workpiece platen disposed adjacent the front end thereof and adjacent said pivotal connection, a broach supporting mechanism supported on said housing means for movement toward and away from said workpiece platen, a power mechanism supported on said housing means and connected with said broach supporting mechanism for moving the same toward and away from said housing means platen, means for actuating said power mechanism, a chip trough supported on said base and extending forwardly from the front wall thereof, said chip trough being pivotally supported on said base so as to be swingable between a position extending forwardly of said base and a position at the side of said base, whereby when said housing means is disposed in a horizontal position said chip trough is disposed in its position extending forwardly from said base and whereby when said housing means is disposed in a vertical position said chip trough may be swung to the side of said base, said base having an opening disposed below said platen when said housing means has been swung to its vertical position and an exteriorly accessible chip chute connected with said base adjacent the bottom thereof and communicating with the interior of said base below said opening through a side wall of said base to permit chips to be removed from said machine through said chip chute.

7. A combination horizontal and vertical broaching machine including a base, elongated housing means supported on said base for movement between a generally horizontal and a generally vertical position, means pivotally connecting said housing means adjacent the front end thereof to said base for movement about a generally horizontal axis, said housing means including a workpiece platen adjacent said pivotal connecting means and an opposed wall spaced from said platen adjacent the opposite end of said housing means, a cylinder rigidly connected with said opposite wall, a piston reciprocable in said cylinder, a piston rod connected with said piston and extending from said cylinder toward said platen, a cross head member connected with the projecting end of said piston rod, a pair of laterally spaced guide bars disposed on opposite sides of said piston rod and extending fore and aft through said platen and said opposite end wall and being slidably disposed therein, a cross head detachably connected with said guide bars on the opposite side of said platen from said piston rod, said latter cross head and said piston rod being adapted to have a broach supporting mechanism selectively connected therewith, and a power mechanism connected with said housing means and with said base and actuatable to move said housing means between a generally horizontal and a generally vertical position.

8. A combination horizontal and vertical broaching machine including a base, elongated housing means supported on said base for movement between a generally horizontal and a generally vertical position, means pivotally connecting said housing means adjacent the front end thereof to said base for movement about a generally horizontal axis, said housing means including a workpiece platen adjacent said pivotal connecting means and an opposed wall spaced from said platen adjacent the opposite end of said housing means, a cylinder rigidly connected with said oposite wall, a piston reciprocable in said cylinder, a piston rod connected with said piston and extending from said cylinder toward said platen, a cross head member connected with the projecting end of said piston rod, a pair of laterally spaced guide bars disposed on opposite sides of said piston rod and extending fore and aft through said platen and said opposite end wall and being slidably disposed therein, a cross head detachably connected with said guide bars on the opposite side of said platen from said piston rod, said latter cross head and said piston rod being adapted to have a broach supporting mechanism selectively connected therewith, a power mechanism connected with said housing means and with said base and actuatable to move said housing means between a generally horizontal and a generally vertical position, and means on said base and housing means, including an adjustable element for positively retaining said housing means in a predetermined position relative to said base.

References Cited in the file of this patent
UNITED STATES PATENTS

| | | |
|---|---|---|
| 451,223 | Leavitt | Apr. 28, 1891 |
| 1,167,091 | McGill | Jan. 4, 1916 |
| 2,135,861 | Thompson | Nov. 8, 1938 |
| 2,158,720 | Hart | May 16, 1939 |
| 2,335,172 | Cornett | Nov. 23, 1943 |

FOREIGN PATENTS

| | | |
|---|---|---|
| 941,223 | France | July 5, 1948 |

UNITED STATES PATENT OFFICE
CERTIFICATE OF CORRECTION

Patent No. 2,849,928                      September 2, 1958

Richard A. Thompson

It is hereby certified that error appears in the printed specification of the above numbered patent requiring correction and that the said Letters Patent should read as corrected below.

Column 1, line 62, for "Fig. 1" read -- Fig. 5 --; column 8, line 47, strike out "of", first occurrence.

Signed and sealed this 25th day of November 1958.

(SEAL)
Attest:

KARL H. AXLINE
Attesting Officer

ROBERT C. WATSON
Commissioner of Patents